United States Patent [19]

Katoh et al.

[11] Patent Number: 4,831,710

[45] Date of Patent: May 23, 1989

[54] METHOD OF ASSEMBLING A VEHICLE DOOR

[75] Inventors: Hideyuki Katoh; Nobutaka Tanaka; Takeshi Yamamoto; Takeshi Konishi; Morio Umeda, all of Hiroshima, Japan

[73] Assignee: Mazda Motor Corporation, Hiroshima, Japan

[21] Appl. No.: 89,286

[22] Filed: Aug. 25, 1987

[30] Foreign Application Priority Data

Aug. 25, 1986 [JP] Japan .................................. 61-197330
Aug. 28, 1986 [JP] Japan .................................. 61-199939
Oct. 16, 1986 [JP] Japan .................................. 61-244260
Oct. 16, 1986 [JP] Japan .................................. 61-244261

[51] Int. Cl.[4] ............................................. B23P 11/00
[52] U.S. Cl. ........................................ 29/434; 29/430; 29/469; 29/525.1; 49/502; 296/146
[58] Field of Search ................ 29/428, 430, 434, 445, 29/469, 526 R; 49/501, 502; 296/146, 188

[56] References Cited

U.S. PATENT DOCUMENTS 4,603,894 8/1986 Osenkowski .................. 296/146 X
4,651,470 3/1987 Imura et al. ....................... 49/502
4,743,062 5/1988 McLaren et al. ................. 296/146

FOREIGN PATENT DOCUMENTS 128621 12/1984 European Pat. Off. ........... 296/146
170150 2/1986 European Pat. Off. ........... 296/146
3004897 8/1981 Fed. Rep. of Germany ...... 296/146
3402135 7/1985 Fed. Rep. of Germany ...... 296/146
198120 12/1982 Japan ................................. 296/146
169316 7/1986 Japan ................................. 296/146
2149726 6/1985 United Kingdom ............... 296/146

Primary Examiner—P. W. Echols
Assistant Examiner—Andrew E. Rawlins
Attorney, Agent, or Firm—Wegner & Bretschneider

[57] ABSTRACT

The vehicle door construction contains an inner door panel and an outer door panel with a skeleton juxtaposed by the inner and outer door panels and mounted with interior door parts.

The vehicle door construction is assembled with the vehicle body by mounting the interior door parts on the skeleton and then mounting the inner door panel on the skeleton.

This vehicle door construction permits a less laborious assembly of the side door and enhances serviceability.

7 Claims, 14 Drawing Sheets

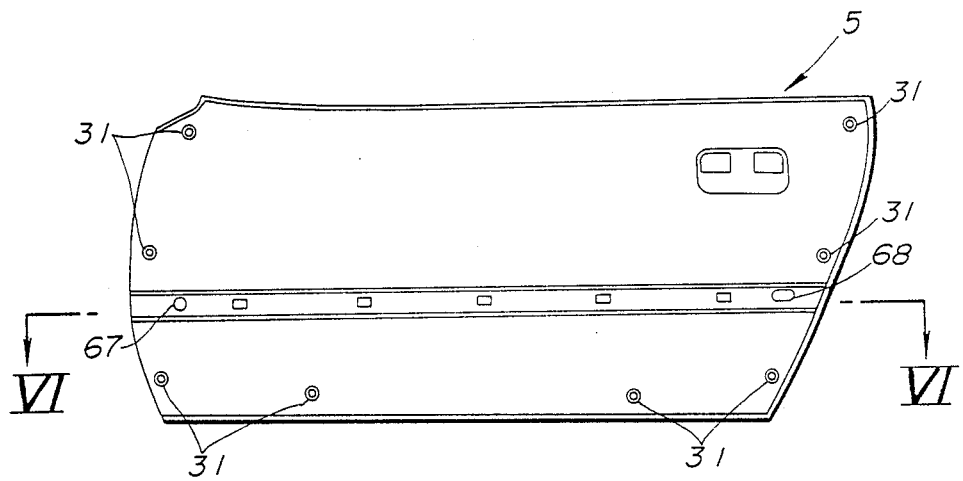
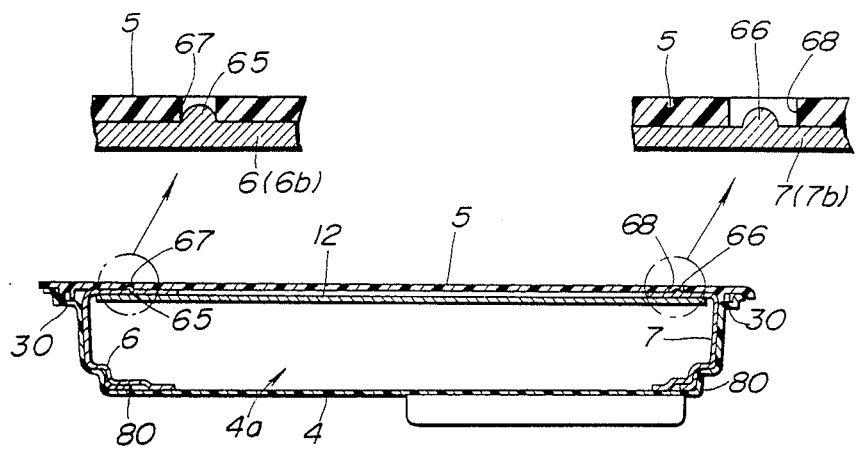

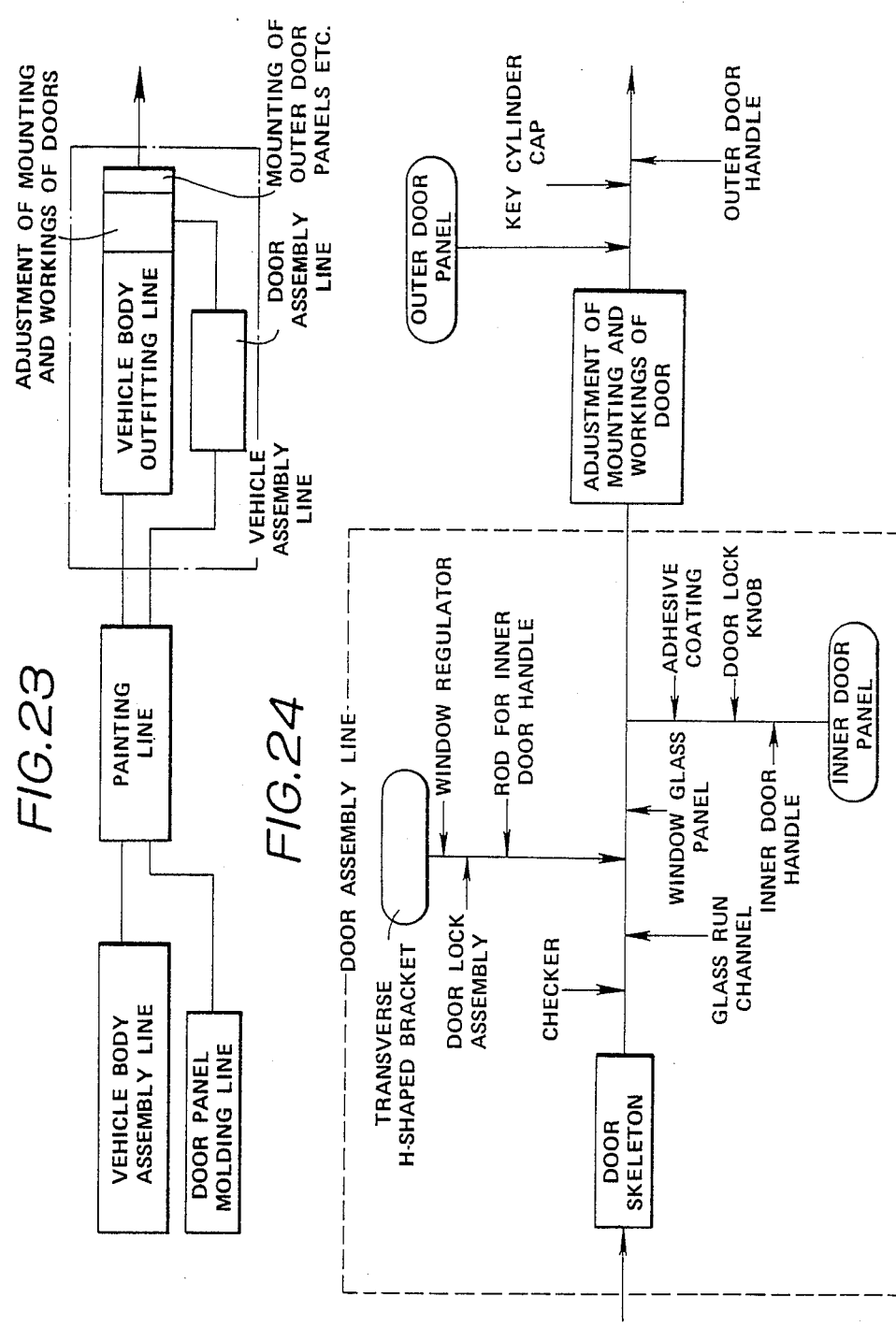

METHOD OF ASSEMBLING A VEHICLE DOOR

BACKGROUND OF THE INVENTION

1. Field of the Invention

The present invention relates to a vehicle door construction and a method of assemblying the vehicle door.

2. Description of the Prior Art

Heretofore, doors of motor vehicles are usually composed of a main door body including an inner door panel and an outer door panel and interior door parts such as a window regulator mounted thereon. The main door body is formed by jointing the inner door panel and the outer door panel to each other at their respective circumferential sides excluding the waist line. This causes interior door parts to be mounted on the main door body using a number of working holes formed on the inner door panel.

More specifically, Japanese Patent Publication No. 59,101/1985 discloses a step of mounting interior door parts on the main door body, or a door outfitting step, in which the interior door parts are inserted through working holes having openings on the inner door panel and mounted at predetermined positions inside the main door body. This conventional step presents the difficulties in the assembly of the interior door panels. More specifically, since the interior door parts are inserted through the working holes of the inner door panel and mounted at the predetermined positions, the locus of transferal of the interior door parts is rendered so complex and the inner space of the main door body is so narrow that workability is made less efficient. This construction presents the difficulty in an automatic assembly of the interior door parts and requires a number of skillful workers for assemblying a number of various interior door parts within a predetermined short time of period. In the conventional assembly line, the door outfitting step should be conducted after the painting of the main door body because the interior door parts are mounted on the main door body. This places a limitation on an arrangement for the door outfitting line within the vehicle body assembly line and requires a high level of attention to the assembly of the interior door parts so as not to damage painted surfaces of the outer door panels during the door assembly step. For the conventional door lock constructions, the parts for the door lock mechanisms such as door lock parts and key cylinders are connected to each other with connecting rods. This mounting step should be conducted within a narrow space of the main door body, thus leading to a laborious operation. In the conventional step of mechanism parts for raising or lowering window glass panels, the window regulator mechanism is likewise connected to the window glass panel in a narrow space within the main door body, whereby this assembly is rendered laborious.

Japanese Patent Application Kokai (Laid-Open) No. 163,070/1986 discloses a conventional step of mounting interior door parts on inner door panels. This conventional door construction is such that a majority of the interior door parts are mounted on the inner door panel. Thus this construction requires the inner door panel to be provided with a number of seats for mounting the interior door parts so that a form of the inner door panel is rendered complex.

As shown in Japanese Patent Publication No. 59,101/1985, workings of the door against the main vehicle body is adjusted using door hinges after the inner door panel and the outer door panel were mounted on each other into the main door body. More specifically, in the conventional vehicle body assembly line, the main door body constituted by the inner and outer door panels is temporarily mounted on the vehicle body using the door hinge for the positioning of the door in order to adjust a space between the main door body and the main vehicle body or workings of the door against the main vehicle body. Accordingly, the door hinges should be fastened with bolts, or the positioning of the door should be adjusted, within a narrow space formed between the main vehicle body and the outer door panel of the main door body, thus rendering workability for the adjustment of workings of the door less efficient and this operation laborious.

SUMMARY OF THE INVENTION

The present invention has the primary object to provide a vehicle door construction and a method of assemblying the same, which improves workability for the assembly of the interior door parts.

The present invention has another object to provide a vehicle door construction and a method of assemblying the same, which enhances the freedom of arrangement for the door outfitting line in the vehicle body assembly line.

The present invention has a further object to provide a method of assembling a vehicle door, which improves workability for adjusting workings of the door against the vehicle body.

The vehicle door construction according to the present invention basically contains an inner door panel and an outer door panel with a skeleton arranged therebetween and mounted with the interior door parts.

This arrangement permits the mounting of the interior door parts on the skeleton prior to the mounting of the inner door panel with the outer door panel thereon. Accordingly, it is noted that the interior door parts can be mounted to the skeleton in a widely open space without any obstruction from the inner door panel and so on. It is further noted that the step of mounting the interior door parts can be combined into the vehicle body assembly line without any restriction by the painting line because the interior door parts can be mounted separately from the mounting of the outer door panel and so on. Thus the door lock mechanisms and the mechanisms of raising and lowering the window glass panel can be outfitted readily into the main door body.

It is preferred that the skeleton is provided with a front frame at the front end portion of a door on which the door hinge is mounted and a rear frame at the rear end portion of a door on which the door lock mechanism is mounted. This construction can enforce a physical strength of the main door body. It is further preferred that the skeleton is provided with a guard bar that can function as protection of the side of the vehicle body against car crashes. The guard bar can also increase the physical strength of the skeleton and enhance rigidity of the door.

It is more preferred that a bracket is mounted detachably on the front frame and the rear frame of the skeleton and that the bracket is mounted with the window glass raising or lowering mechanism or the door lock mechanism. This construction permits the mounting of the bracket on the skeleton in such a state that the window glass raising or lowering mechanism or the door lock mechanism is mounted on the bracket, thus improving workability for the complex mounting of these mechanisms to a remarkable degree. This also makes it possible to separately carry out the step of mounting the window glass raising or lowering mechanism or the door lock mechanism on the bracket and the step of mounting the resulting bracket on the skeleton, thus intensifying these steps and simplifying the assembly line as a whole.

In the vehicle door construction according to the present invention, the skeleton is juxtaposed by the inner door panel and the outer door panel, thus permitting the skeleton to share a physical strength and rigidity of the door. As a result, it becomes possible to make the inner and outer door panels plastic and consequently to meet requirements for complex forms of the door panels.

It is further to be noted that, since the interior door parts are mounted on the skeleton, the inner and outer door panels can be mounted detachably on the skeleton. This construction improves serviceability. This effect can be achieved particularly when the outer door panel is mounted detachably.

In accordance with the present invention, the outer door panel is provided with means for positioning the inner door or the skeleton. In adjusting the position of the side door against the main vehicle body using a door hinge, the outer door panel is temporarily mounted on the door hinge and then the position of the outer door panel is determined in a spaced relationship against the main vehicle body by adjusting the position of the door hinge. After the completion of the positioning, the outer door panel is taken out from the skeleton and the interior door parts are mounted on the skeleton.

The positioning means provided on the outer door panel permits reproduction of the positioning of the inner door panel or the skeleton and enables adjustment of the workings of the side door panel against the main vehicle body by adjusting the position of the door hinge in such a state that the outer door panel is temporarily mounted on the skeleton. This vehicle door construction further permits the mounting of the interior door parts of the skeleton in such a state that the outer door panel is detached from the skeleton. Accordingly, this arrangement can prevent the outer door panel from being damaged in the painted surface and provide more space for the mounting or assembly of the door parts, thus improving workability.

By providing the outer door panel with the positioning means for adjusting the position of the side door against the main vehicle body, it is possible to outfit the interior door parts and mount the inner door panel on the skeleton prior to the assembly of the side door on the main vehicle body and then to adjust the position or workings of the side door against the main vehicle body. Thereafter, the outer door panel may be mounted on the skeleton and/or the inner door panel. This adjustment of the workings of the side door against the main vehicle body prior to the mounting of the outer door panel can produce the same effect as when the position of the side door against the main vehicle body is adjusted in such a state that the outer door panel is mounted. Accordingly, this construction allows the door hinge to be fastened in the stop of assembly the side door to the main vehicle body without any obstruction from the outer door panel. This also permits the interior door parts to be outfitted prior to the mounting of the outer door panel so that this outfitting step gives no risk of damaging the painted surface of the outer door panel and provides a wide working space leading to improvement in workability.

BRIEF DESCRIPTION OF THE DRAWINGS

FIGS. 1 to 16 represent the first embodiment of a vehicle door construction according to the present invention, in which:

FIG. 1 is a perspective view of one embodiment of a side door after the completion of the assembly;

FIG. 2 is a perspective view of the side door with interior door parts mounted on the skeleton;

FIG. 3 is a front view of an outer door panel taken from the inside thereof;

FIG. 4 is an exploded view of portions of the skeleton:

FIG. 5 is a perspective view, with ports cut away, of a door lock mechanism;

FIG. 6 is a cross sectional view of the assembly of the outer door panel, the skeleton and the inner door panel, taken on the line VI—VI of FIG. 3;

FIG. 7 is a cross sectional view of the joint of the outer door panel with the inner door panel, taken on the line VII—VII of FIG. 1;

FIG. 8 is an enlarged fragmentary sectional view of the assembly of a checker;

FIG. 9 is a perspective view of the connection of an inside door handle with a connecting rod;

FIG. 10 is each a perspective view of the connection of a door lock knob with a connecting rod;

FIG. 11 is a partially sectional view of the connection of the outer door panel with a key cylinder;

FIG. 12 is a partially sectional view of a door hinge;

FIG. 13 is a flow chart of a vehicle body assembly line according to the present invention;

FIG. 14 is a flow chart of a door assembly line according to the present invention;

FIG. 15 is a cross sectional view of a variation example of the connection of the outer door panel with the inner door panel; and FIG. 16 is a cross section view of another example of the connection of the outer door pael with the inner door panel with a hole for withdrawing water leaked into the side door.

FIGS. 17 and 18 represent the second embodiment of the vehicle door construction according to the present invention, in which:

FIG. 17 is an exploded view of the skeleton; and

FIG. 18 is a perspective view of a bracket for mounting a door lock mechanism.

FIGS. 19 to 24 represent the third embodiment of the vehicle door construction according to the present invention, in which:

FIG. 19 is a front view of the outer door panel taken from the outside thereof;

FIG. 20 is a front view of the side door mounted on the vehicle body;

FIG. 21 is a cross sectional view of the connection of the outer door panel to the front frame and the inner door panel taken on the line XXI—XXI of FIG. 19;

FIG. 22 is a cross sectional view of the connection of the outer door panel to the rear frame and the inner door panel taken on the line XXII—XXII of FIG. 19;

FIG. 23 is a flow chart of another vehicle assembly line according to the present invention; and FIG. 24 is a flow chart of another door assembly line according to the present invention.

DETAILED DESCRIPTION OF THE PREFERRED EMBODIMENTS

The present invention will be described more in detail with reference to the drawings attached hereto.

First Embodiment (FIGS. 1 to 16)

Figure 1:
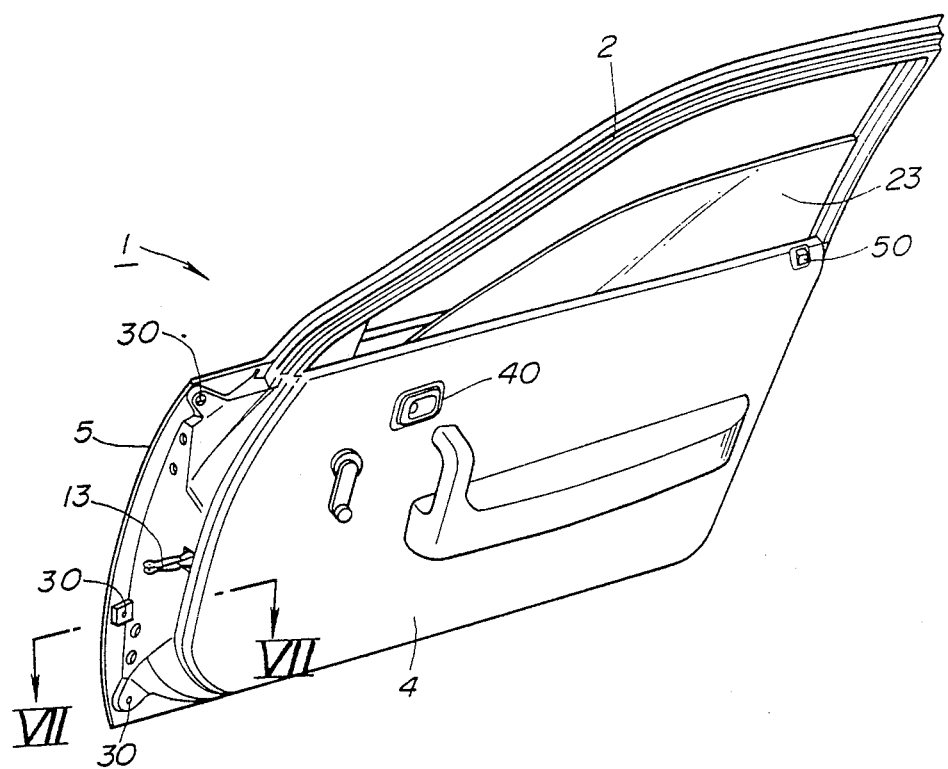

Referring to FIG. 1, it is shown that a side door 1 of a vehicle is of the type of a sash door which contains a sash 2 on the upper portion thereof and skeleton 3 (as specifically shown in FIG. 2), an inner door panel 4 and an outer door panel 5 on the lower portion thereof. As specifically shown in FIG. 1, the inner door panel 4 and the outer door panel 5 are juxtaposed on the both sides of the skeleton 3. A number of interior door parts are mounted on the skeleton 3, as will be described in detail. It is to be noted as a matter of course that this invention is applicable to sashless doors.

Inner and Outer Door Panels

The inner door panel 4 may be made of plastic material. The inner door panel 4 is molded by the deep drawing in a form so as to open outwardly toward the outside of the vehicle chamber. As shown in FIG. 6, a cavity 4a of the inner door panel 4 is formed to adapt an outer dimension of the skeleton 3 and permit accommodation of the skeleton 3 therewithin.

Figure 7:
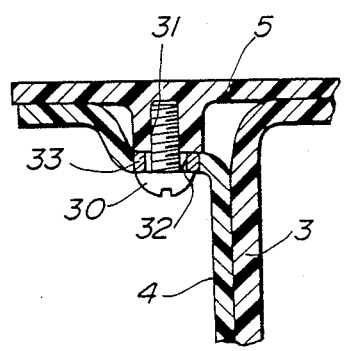

Referring to FIG. 7, it is shown that the inner door panel 4 is provided with through holes 32 on the three sides of the circumference thereof, excluding the waist line, in order to fasten the inner door panel 4 to the outer door panel 5 using the bolts 30.

The outer door panel 5 may also be made of plastic material. Referring now to FIG. 3, it is shown that the outer door panel 5 is provided with tapped holes 31 at positions corresponding to the positions of the through holes 32 of the inner door panel 4.

Turning now to FIG. 3, it is shown that the outer door panel 5 is provided on its inner surface with a positioning hole 67 at the front portion thereof and a positioning hole 68 at the rear portion thereof. As shown in FIG. 6, the positioning hole 67, on the one hand, is constructed so as to tightly receive a projection 65 provided on the front frame 6. It is also shown therein that the positioning hole 68, on the other hand, is constructed in such a rectangular form as having a breadth with substantially the same size as the outer diameter of a projection 66 provided on the rear frame 7 and a length extending in the lengthwise direction so as to adapt a clearance between the positioning hole 68 and the projection 66. This relative arrangement for the constructions of the projections 65 and 66 against the positioning holes 67 and 68 allows a small degree of error in the relation positions thereof upon molding to be cleared. The positioning holes 67 and 68 may be covered with side protectors (not shown). As specifically shown in FIG. 7, the inner door panel 4 is fixed on the outer door panel 5 by fastening the bolts 30 through the through holes 32 that are each formed so as to have a diameter larger than the diameter of the bolt 30. And an enlarged head of the bolt 30 is received by a metal spacer 33, whereby the bolt is prevented from being loosened.

Figure 15:
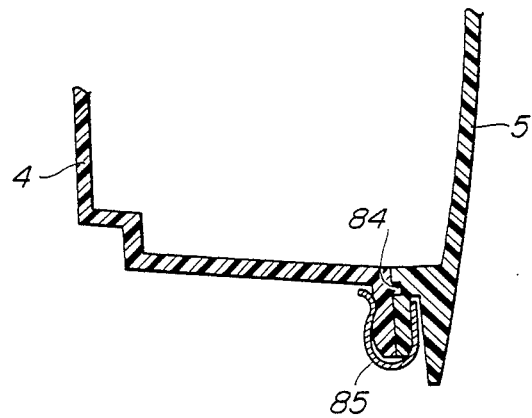

FIG. 15 shows another example of the way of the joint of the inner door panel 4 to the outer door panel 5. The inner door panel is shown to have the bottom portion with an extension having a projection 84 that is formed so as to be tightly inserted into a groove formed on an extension at the bottom portion of the outer door panel 5. The extensions are then jointed to each other with a clip 85 extending in the front and rear direction. This can reduce the number of bolts 30 for fixing the outer door panel 5, thereby improving workability in the assembly of the outer door panel 5.

Figure 16:
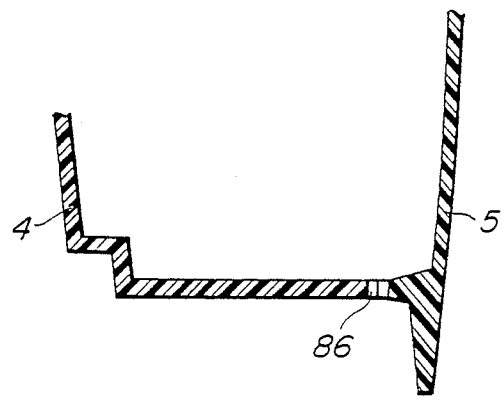

FIG. 16 shows a further example of the construction of the joint of the inner door panel 4 to the outer door panel 5. In this embodiment, there is shown to be formed a through hole 86 for drainage of rain water penetrated into the side door 1. The through hole 86 is formed between the facing surfaces of the bottom portions of the inner door panel 4 and the outer door panel 5.

Skeleton

Figure 2:
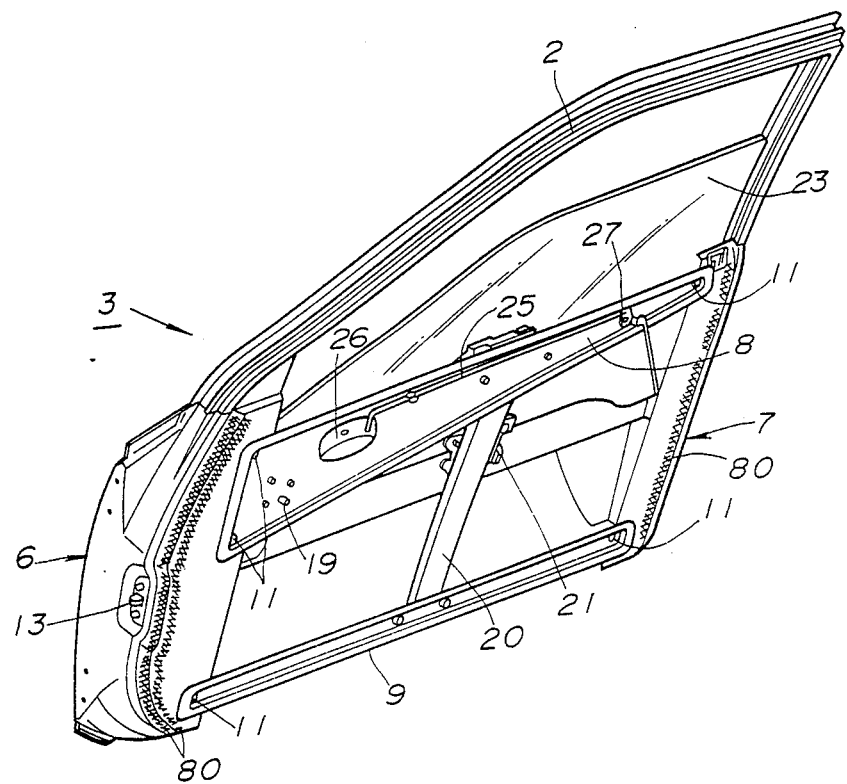
Figure 4:
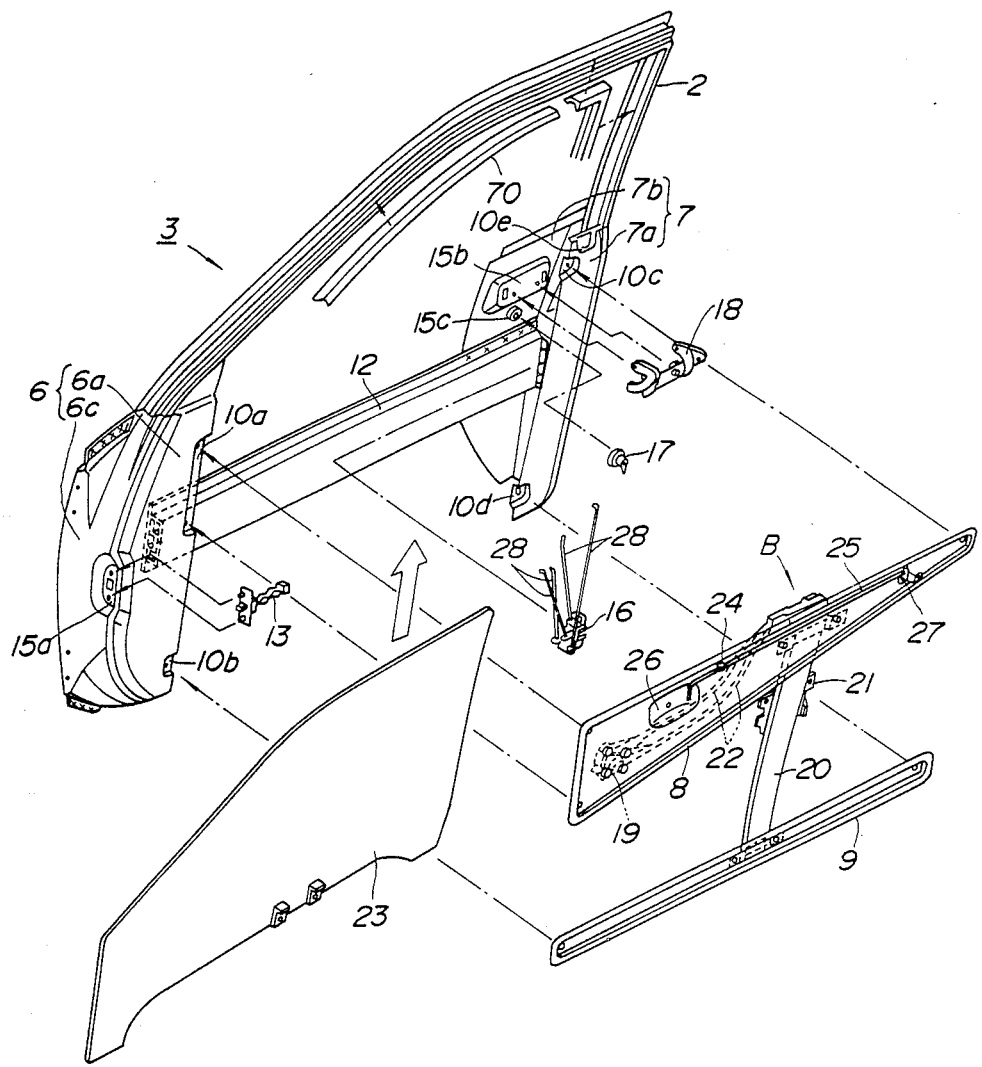

Referring to FIGS. 2 and 4, it is shown that the skeleton 3 includes a front frame 6, a rear frame 7, an upper stay 8 and a lower stay 9. Each of the parts 6 to 9 may be made of a steel plate.

The front frame 6 is positioned at the front end portion of the side door 1 extending all the way down from the waist line to the bottom end portion on the front end portion thereof, on the one hand. The rear frame 7 is positioned at the rear end portion of the side door 1 extending all the way down from the waist line to the bottom end portion on the rear end portion thereof, on the other hand. As shown specifically in FIG. 6, the front frame 6 and the rear frame 7 have each a square C-shaped cross section and are mounted with the inner door panel 4.

Referring to FIG. 4, on the one hand, it is shown that the front frame 6 contains an inner wall portion 6a extending along the inner door panel 4, an outer wall portion 6b extending along the outer door panel 5 (FIG. 6), and a side wall portion 6c connecting the inner wall portion 6a to the outer wall portion 6b. Referring to FIG. 4, on the other hand, it is shown that the rear frame 7 contains an inner wall portion 7a extending along the inner door panel 4, an outer wall portion 7b extending along the outer door panel 5, and a side wall portion 7c (FIG. 5) connecting the inner wall portion 7a to the outer wall portion 7b.

As shown specifically in FIG. 6, the front frame 6 and the rear frame 7 are constructed so as to allow the openings of the respective square C-shaped cross sections thereof to face each other and that one end portions of the front and rear frames 6 and 7 facing each other are fixed to the respective front and rear portions of the inner door panel 4 and the other end portions thereof facing each other are likewise fixed to the respective front and rear portions of the outer door panel 5, thus surrounding the cavity 4a.

Referring again to FIG. 4, it is shown that the bottom portions of the sash 2 are integrally fixed to the respective inner surfaces of the side wall portion 6c of the front frame 6 and the side wall portion 7c of the rear frame 7.

As shown in FIGS. 2 and 6, the upper stay 8 and the lower stay 9 are constructed extending in the front and rear direction and positioned at an up and down spaced relationship so as to bridge the front frame 6 and the rear frame 7. The inner wall portion 6a of the front frame 6 is provided with a pair of outwardly open upper and lower seats 10a and 10b, respectively, for mounting one end of the upper stay 8 and the lower stay 9, respectively. Likewise the front frame 6, the inner wall portion 7a of the rear frame 7 is provided with a pair outwardly open upper and lower seats 10c and 10d, respectively, for mounting the other ends of the upper stay 8 and the lower stay 9. As shown in FIG. 2, the upper stay 8 and the lower stay 9 are mounted on the respective mounting seats on the front frame 6 and the rear frame 7 and fixed thereon using bolts 11.

Turning to FIG. 4, a guard bar 12 may be secured at its one end portion to the outer wall portion 6b of the front frame 6 and at its the other end portion to the outer wall portion 7b of the rear frame 7 by the spot welding at sites represented by marks x. The guard bar 12 serves as protection of the side door from a car crash. The guard bar may be made of a steel plate and have double closed cross sections.

Mounting of Interior Door Parts

Various interior door parts are mounted on the skeleton 3, thereby performing the objects according to the present invention.

Front and Rear Frames

Referring to FIG. 4, it is shown that the interior door parts such as a checker 13, a door lock part 16, a key cylinder 17, a pull-up type outside door handle member 18 are mounted on mounting seats 15 formed on the skeleton 3.

Figure 8:
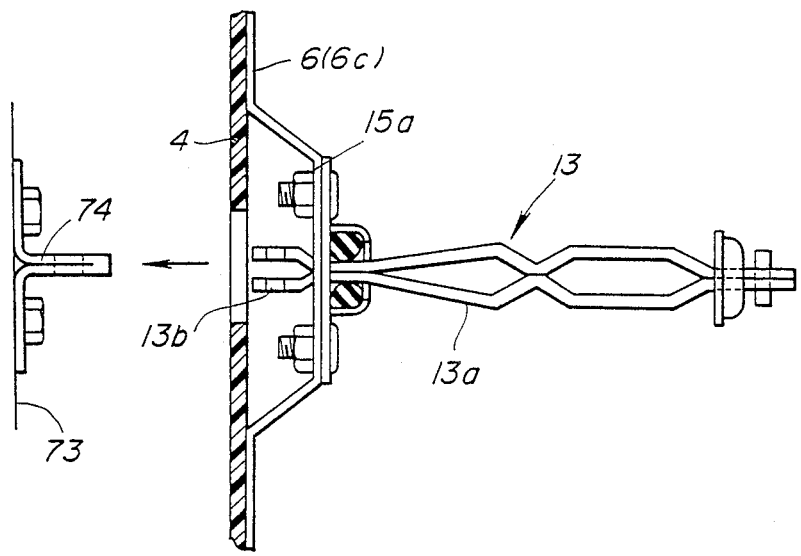

It is specifically shown therein that the front frame 6 is provided at the side wall portion 6c with a mounting seat 15a for mounting the checker 13 is an inwardly concaved form, thereby allowing the checker 13 in such a state as shown in FIG. 8 to be accommodated therein in such a manner as not to block the mounting of the inner door panel 4. The checker 13 is such that the tip portion 13b is in an outwardly open form so that, when the body 13a is in a state as shown in the right-hand portion of FIG. 8, the tip portion 13b prevents the body 13a from being removed. The inner door panel 4 is mounted while the checker 13 is in a form as shown in right-hand of FIG. 8. After the side door 1 is assembled on the main vehicle body, the body 13a is pulled out and connected to a receiving member 74 mounted on a pillar 73 with a pin (not shown) as shown in the left-hand portion of FIG. 8.

It is also shown specifically in FIG. 4 that the outer wall portion 7b of the rear frame 7 is provided with a mounting seat 15b for mounting the pull-up type outside door handle member 18. The outside door handle member 18 may be mounted to the mounting seat 15b as shown specifically in FIG. 5. The outer wall portion 7b of the rear frame 7 is further provided with an opening 15c through the key cylinder 17 is mounted.

Figure 5:
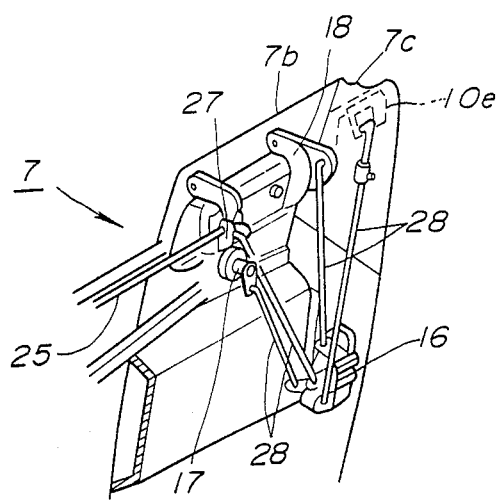

Referring to FIG. 5, the door lock part 16 is shown to have four extension rods, referred to generally as 28, and is secured by the spot welding to the inner side of the outer wall portion 7b of the rear frame 7. One of the extension rods 28 is connected to the key cylinder 17, two of them to the door lock part 18 and the other of them to the top portion of the inner wall member 7b.

Figure 11:
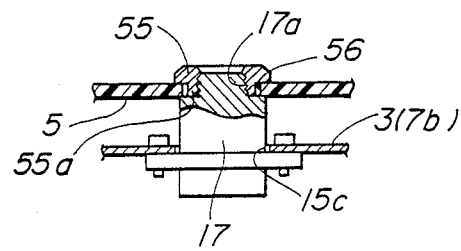

Turning now to FIG. 11, it is shown that the key cylinder 17 is mounted in the opening 15c on the outer wall portion 7b of the rear frame 7. The top portion of the key cylinder 17 is threaded to engage with a key cylinder cap 55 that is larger sufficiently to cover a through hole 56 of the outer door panel 5. A gap is provided between the through hole 56 and the tip portion 55a of the key cylinder cap 55 so as to offset a difference in the relative positions between the key cylinder 17 and the through hole 56, thus leading to a favorable look.

Referring again to FIG. 4, it is shown that an inside door lock knob 50 is mounted in a hole 10e formed on the top portion of the inner wall portion 7a of the rear frame 7. As shown specifically in FIG. 10, a rear surface 50a of the inside door lock knob 50 is provided with an L-shaped groove 51 for receiving the connection rod 28 extending from the door lock part 16. The open end of the L-shaped groove 51 is constructed so as to become partially smaller than the outer diameter of the rod 28, thereby preventing the connection rod 28 from being withdrawn from the groove 28. The top end portion 28a of the connection rod 28 is curved in the L-shaped form to correspond to the groove 51. The inside door lock knob 50 is connected to the connection rod 28 by inserting the top end portion 28a of the connection rod 28 into the groove 51 by pressing the top end portion 28a of the connection rod 28 onto the L-shaped groove 51 of the inside door lock knob 50. This renders a connection operation of the inside door lock knob 50 to the connection rod 28 simple.

Upper and Lower Stays

Referring now to FIG. 4, it is shown that the upper stay 8 is bolted to the upper portion of a window glass guide 20 and the lower stay 9 is bolted to the lower portion of the window glass guide 20, thus forming a transverse H-shaped bracket "B" for mounting the interior door parts such as a window regulator mechanism 19 and an inside door handle 40. On the window guide 20 is mounted an upwardly and downwardly movable bracket 21 for mounting a window glass panel 23, and the window glass panel 23 is fixed to the movable bracket 21 with bolts (not shown). It is also shown that the window regulator mechanism 19 is mounted on the inside of the upper stay 8 and it is connected through wires 22 to the top portion of the window glass guide 20.

Figure 9:
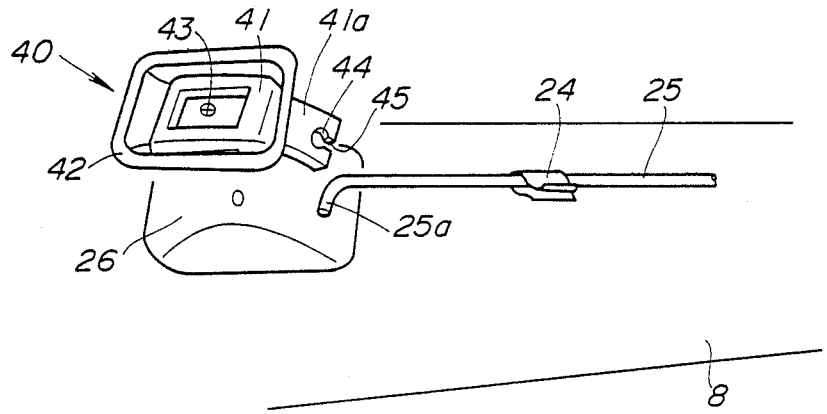
Figure 10:
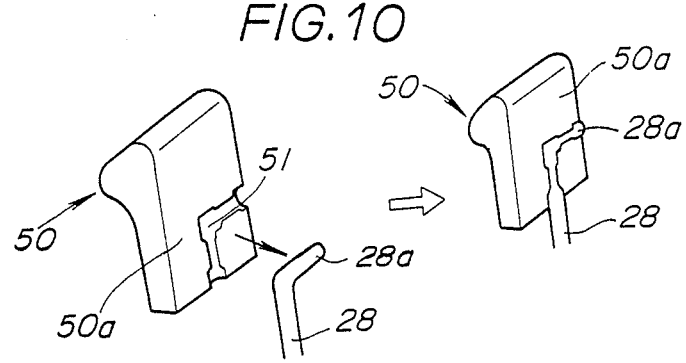

Turning now to FIGS. 4 and 9, it is shown that the inside door handle 40 is fastened with a bolt 43 on the mounting seat 26 formed on the outer side (inside the vehicle chamber) of the upper stay 8. As specifically shown in FIG. 9, the inside door handle 40 includes a door handle body member 41 and a frame member 42. A base portion 41a of the door handle body member 41 is provided with a through hole 44 for receiving a a connecting rod 25 for connecting the inside door handle to a bell crank 27. The through hole 44 has an opening 45 on a base surface of the inside door handle body member 41, and the opening 45 is formed in a size slightly larger than the outer diameter of the connecting rod 25. This construction allows the connecting rod 25 to be inserted into the through hole 44 merely by pressing the inside door handle body member 41 onto the connecting rod 25.

It is further shown therein that the connecting rod 25 is mounted with a clip 24 on the outside of the upper stay 8 so as to extend in the front and rear direction. The front end portion 25a of the connecting rod 25 is inserted through the opening 45 into the through hole 44 to face the mounting seat 26 for the inside door handle 40, and the rear end portion is connected to one end of a bell crank 27 (FIG. 5). The top end portion 25a of the connection rod 25 is curved so as to be engageable with the base portion 41a of the inside door handle body member 41, thereby leading to protection against removal of the connecting rod 25.

The front ends of the upper stay 8 and the lower stay 9 are fixed with bolts to the upper seat 10a and the lower seat 10b on the inner wall portion 6a of the front frame 6, respectively. The rear ends of the upper stay 8 and the lower stay 9 are fixed with bolts to the upper seat 10c and the lower seat 10d of the inner wall portion 7a of the rear frame 7, respectively. The upper stay 8 and the lower stay 9 are mounted in an up and down distance and extend in the front and rear direction.

Assembly Line

Figure 12:
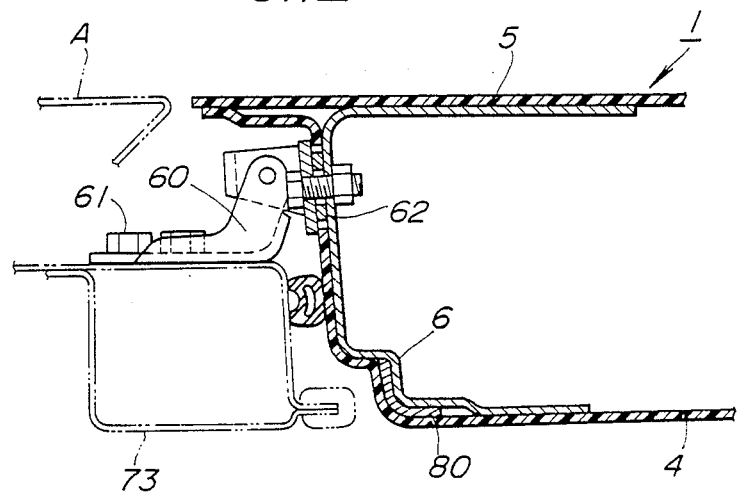
Figure 13:
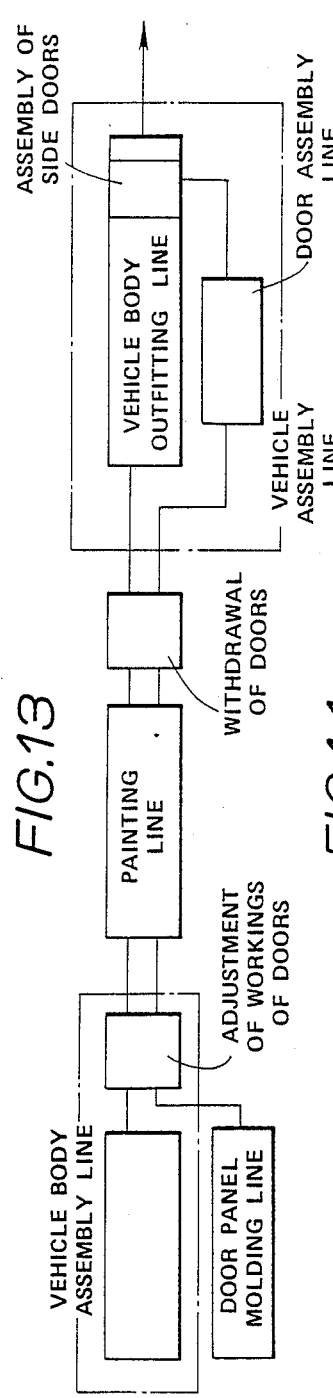
Figure 22:
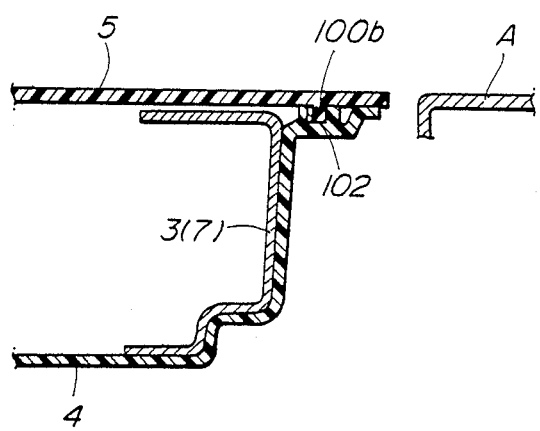

FIG. 13 shows an example of a vehicle body assembly line. In this embodiment, it is shown that the position or workings of the side door 1 against the main vehicle body A is adjusted prior to entry into a painting line. More specifically, as shown in FIG. 12, the position of the side door 1 against the main vehicle body may be made by adjusting the location of a door hinge 60. The positioning of the door hinge 60 is made against a pillar 73 by adjusting a space "L" as shown in FIG. 22 between the outer door panel 5 and the vehicle body A in such a state that the outer door panel 5 is temporarily mounted on the skeleton 3. After the completion of the positioning, the door hinge 60 is fastened on the pillar 73 with a bolt 61. Between the door hinge 60 and the skeleton 3 is interposed a collar 62 that prevents the loosening of a bolt 63 for fixing the door hinge 60 on the inner door panel 4. The collar 62 is welded on the door hinge 60 in the door assembly line in a manner so as not to interrupt the assembly of the side door 1.

Temporary Mounting of Outer Door Panel

As shown in FIG. 6, the temporary mounting of the outer door panel 5 is effected by inserting the projection 65 of the front frame 6 and the projection 66 of the rear frame 7 into the positioning holes 67 and 68 of the outer door panel 5, respectively.

The construction of the positioning holes 68 in such a rectangular form as has been described above enables the projections 66 to be matched with each other even if there would be a gap in the relative positions in the lengthwise direction between the projections 65 and 66 and the the positioning holes 67 and 68 with the respective projections 65 and 66.

Turning now to FIG. 13, it is shown that the vehicle body is then transferred to a painting line. After the vehicle body is painted in the painting line, the skeleton 3 with the outer door panel 5 is withdrawn from the vehicle main body by removing the skeleton 3 from the door hinge 60. The vehicle main body is then transferred to a vehicle body outfitting line for outfitting vehicle body parts thereon while the skeleton 3 is transferred to a door assembly line for the side door 1.

Door Assembly Line

Figure 14:
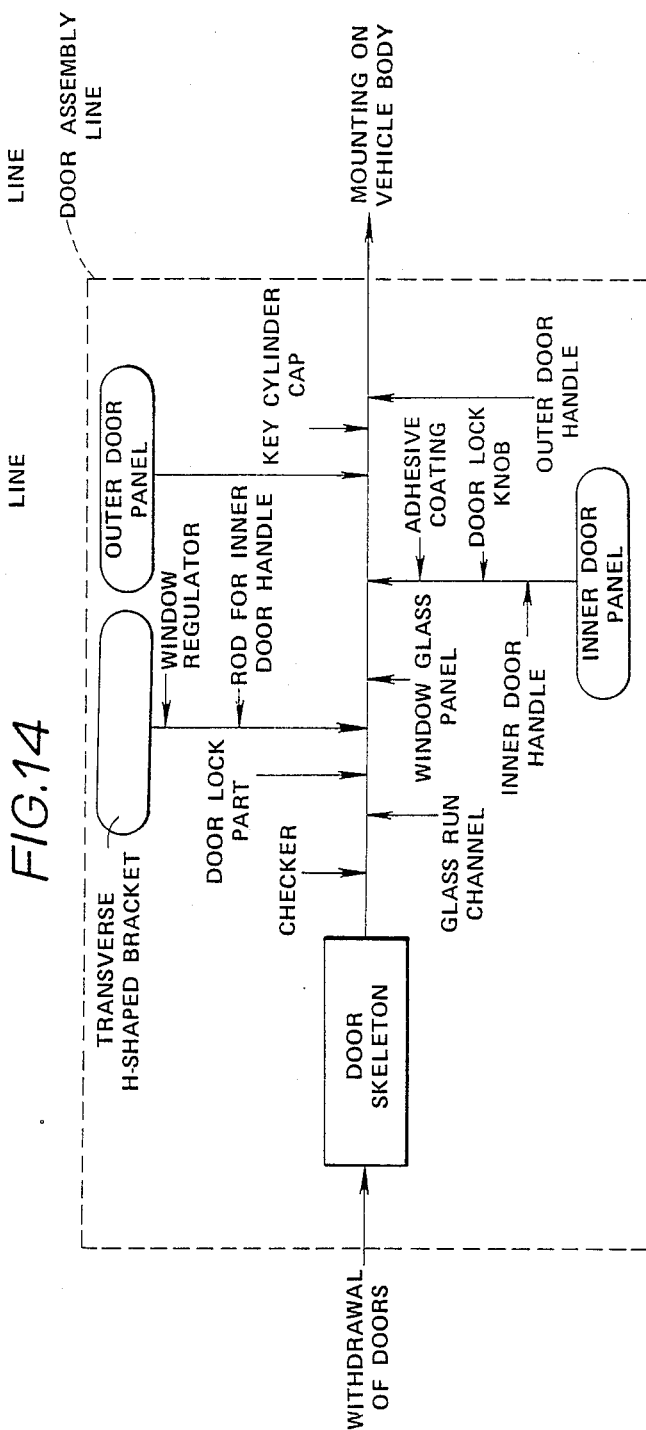

As shown in FIG. 14, a door assembly line is constituted first by mounting on the skeleton 3 the door parts such as the checker 13, a window glass run channel 70, the door lock part 16, the transverse H-shaped bracket "B" and the window glass panel 23 prior to the mounting of the outer door 5.

The checker 13 is first mounted on the mounting seat 15a on the skeleton 3, more specifically, on the side wall portion 6c of the front frame 6. The window glass run channel 70 is integrally fixed to the sash 2 and the door lock part 16 is then mounted on the skeleton 3, more specifically, on the outer wall portion 7b of the rear frame 7.

To the upper stay 8 and the lower stay 9 is mounted the window glass guide 20 to form the transverse H-shaped bracket "B" as shown in FIG. 14. To the H-shaped bracket "B" are mounted the inner door parts including the window regulator mechanism 19 and the rod 25 for the inside door handle 40. The H-shaped bracket "B" is then mounted on the mounting seats 10a and 10b of the front frame 6 and the mounting seats 10c and 10d of the rear frame 7, respectively, as shown in FIG. 4.

The window glass panel 23 is then mounted on the bracket 21 by inserting it into a space between the front frame 6 and the rear frame 7 from the bottom of the front and rear frames 6 and 7. This improves assembly performance of the window glass panel 23.

As have been described above, the interior door parts are mounted on the skeleton 3 prior to the mounting of the inner and outer door panels 4 and 5 so that a working space can be efficiently employed without any obstruction from their door panels 4 and 5. This will of course lead to improvement in workability and promote an automation of the assembly of the side door 1.

After the mounting of the inside door panel handle 40 and the inside door lock knob 50 to the inner door panel 4, the inner door panel 4 is fixed to the skeleton 3 with an adhesive 80, as shown in FIGS. 2 and 6. The outer door panel 5 is then fixed detachably to the inner door panel 4 with the bolts 30, as shown in FIGS. 3 and 7. This arrangement enables the outer door panel 5 to be easily detached from the inner door panel 4 after the assembly of the side door 1 to the vehicle main body so that interior door parts can be exchanged easily, thus leading to enhancement in serviceability.

To the skeleton thus assembled are then the key cylinder cap 55 and an outside door handle (not shown).

As have been described above and shown in FIG. 1, the side door 1 thus assembled is then mounted on the vehicle body.

It is to be noted that the order of mounting the interior door parts may be changed in an arbitrary manner as long as modifications of the order do not obstruct the door assembly line. For instance, the outer door panel 5 may be detachably mounted on the skeleton 3 or both the skeleton 3 and the inner door panel 4. Further, the inside door handle 40 may be mounted after the mounting of the inner door panel 4 to the skeleton 3.

Other Embodiments

Figure 17:
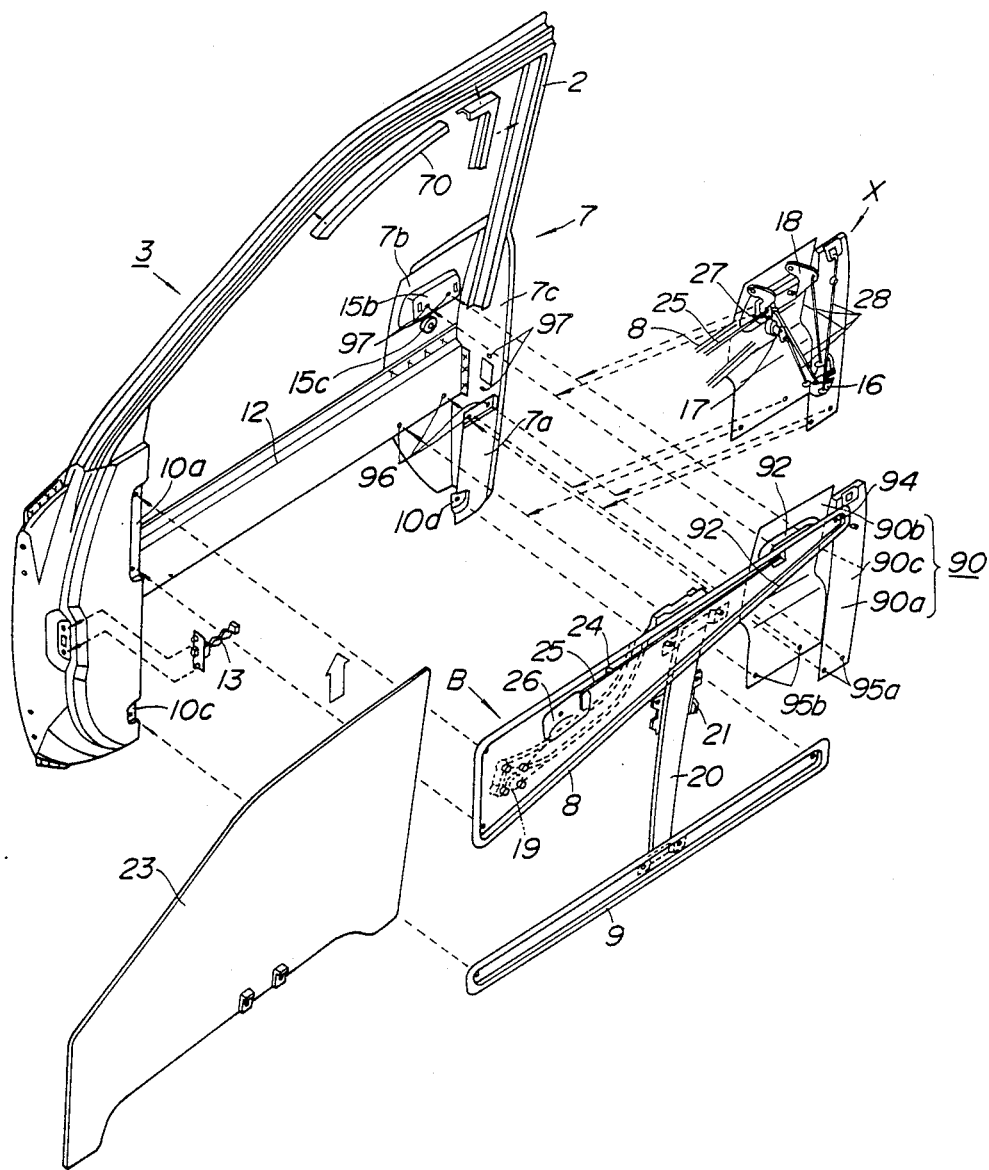

FIG. 17 and the figures that follow represent other embodiments of the vehicle door construction according to the present invention. In the following description, identical and like elements will be referred to by the same reference numbers as in the first embodiment as described above, and the description of those elements will be omitted for brevity and characteristic portions of the other embodiments will be described below in detail.

Figure 18:
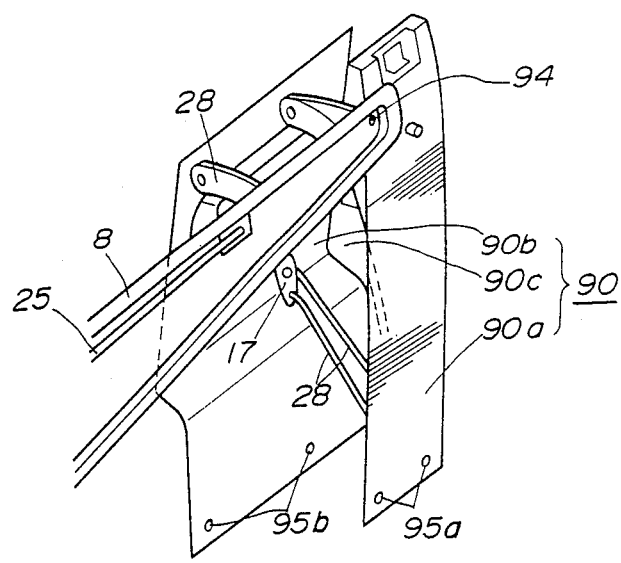

Second Embodiment (FIGS. 17 and 18)

In this embodiment, the inside door lock mechanism parts are mounted on the rear frame 7 through a bracket 90.

Referring to FIGS. 17 and 18, it is shown that the bracket 90 for mounting the inner door lock mechanism parts includes an inner plate member 90a, an outer plate member 90b and a connection bracket portion 90c. The inner plate member 90a constitutes part of the inner wall portion 7a when it is mounted on the rear frame 7.

The outer plate member 90b is mounted so as to face the outer wall portion 7b of the rear frame 7. The connection bracket portion 90c is constructed so as to connect the inner plate member 90a to the outer plate member 90b and face the end wall portion 7c of the rear frame 7.

The bracket 90 is provided with mounting seats for mounting the inside door lock part 16, the key cylinder 17 and the outside door handle 18. After these door lock mechanism parts are mounted on its mounting seats, the bracket 90 is then fixed to the rear frame 7 constituting the skeleton 3 in such a manner that it becomes part of the rear frame 7. The door lock part 16 is mounted on the bracket 90 and connecting rods, referred to generally as 28, extending from the door lock part 16 are connected, respectively, to the key cylinder 17, the outside door handle members 18 and the bell crank 27.

As shown in FIG. 18, the bracket 90 is further fixed on the rear end portion of the upper stay 8 of the transverse H-shaped bracket B that is mounted in advance with the window glass raising or lowering mechanism parts. The rear end portion of the upper stay 8 is then bolted to the skeleton 3 with a bolt 94. The inner plate member 90b of the bracket 90 is bolted to the inner wall portion 7a of the rear frame 7 through holes 90a, and the outer plate member 90b is bolted to the rear portion of the guard bar 12 through holes 90b.

As have been described hereinabove, the transverse H-shaped bracket "B" is mounted to the skeleton 3 after the window glass raising or lowering mechanism parts and the door lock mechanism parts were mounted on the bracket 90. This improves workability of the mounting of the parts. Furthermore, as these steps can be conducted separately from each other, this enables and serves as intensifying the work of mounting the interior door parts.

In this embodiment, the bracket 90 is in a square C-shaped form in cross section and lies partially on the rear frame 7. This arrangement of the bracket serves as enforcement of rigidity of the skeleton 3.

Third Embodiment (FIGS. 19 to 24)

Figure 19:
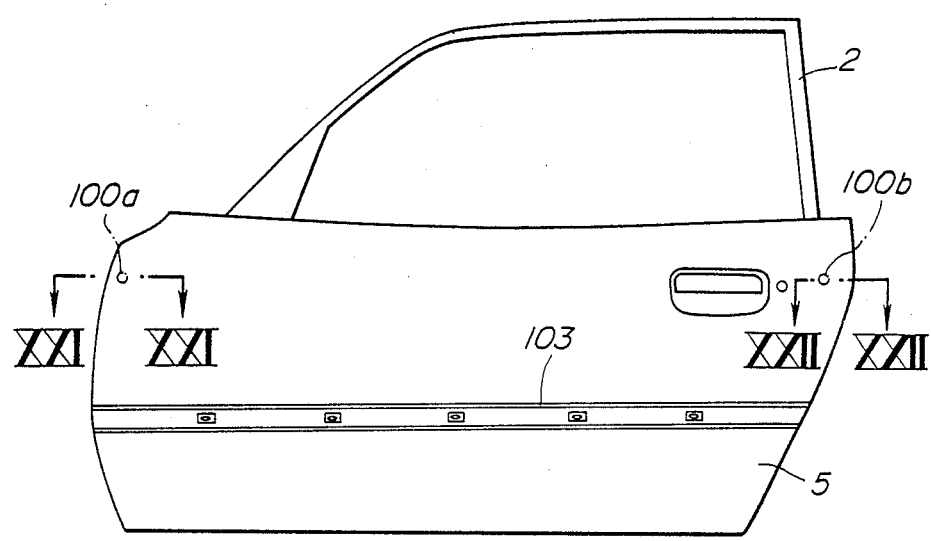
Figure 20:
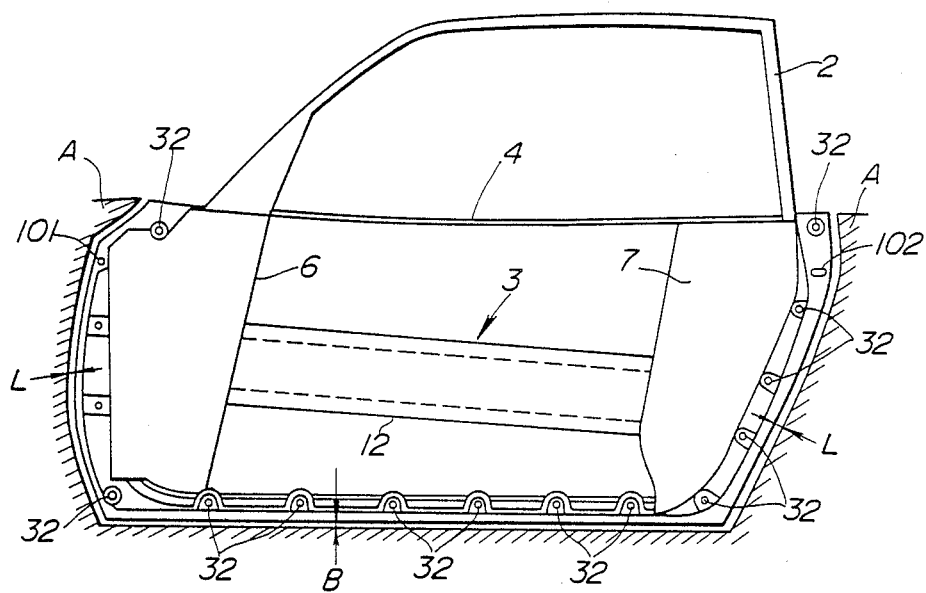
Figure 21:
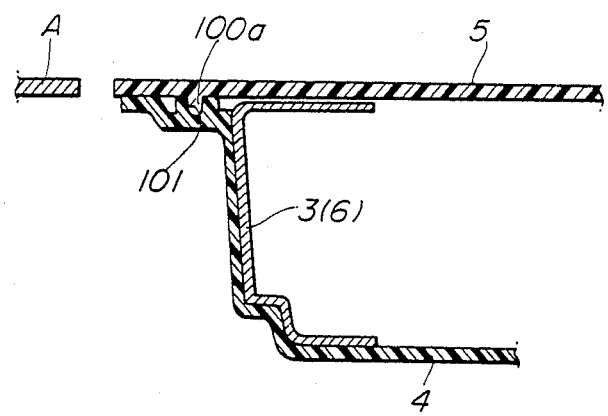

It is shown in FIG. 19 that the outer door panel 5 is provided with two projections 100a and 100b facing the inner door panel 4 while it is shown in FIG. 20 that the inner door panel 4 is provided with a positioning hole 101 for receiving the projection 100a and a positioning hole 102 for receiving the projection 100b. As shown in FIG. 21, the projection 100a is constructed so as to tightly fit the positioning hole 101, on the one hand, and, as shown in FIG. 22, the positioning hole 100b is constructed in a rectangular form extending is the transverse direction and having a breadth (a size in the vertical direction) with substantially the same size as the outer diameter of the projection 100b. The construction of the positioning hole 102 can tightly hold the outer surface of the projection 100b in the vertical direction even if there would be some irregularity in the relative positions of these positioning holes with the projections.

As shown in FIG. 19, reference symbol 103 denote grooves for side protectors.

In the vehicle assembly according to this embodiment of the present invention, the adjustment of the workings of the side doors against the main vehicle body is made in the downstream side of the vehicle body outfitting line as shown in FIGS. 23 and 24.

The assembly of the side door 1 is conducted in the manner as shown in FIG. 24. Like the first embodiment as shown above, the upper stay 8 and the lower stay 9 are combined using the window guide 20 to form a transverse H-shaped bracket "B" that is in turn provided with the window regulator 19 and the related parts. The thus mounted bracket "B" is then mounted on the front frame 6 and the rear frame 7 of the skeleton 3.

After the mounting of the transverse H-shaped bracket "B" to the skeleton 3, the interior door parts are mounted to the skeleton 3, and inner door panel 4 is secured to the skeleton 3 with an adhesive 80. The skeleton 3 with the interior door parts and the inner door panel 4 is then assembled with the vehicle body "A" through the door hinge 60 while a space "L" as shown in FIG. 22 between the inner door panel 4 and the vehicle body "A" is adjusted. After the completion of the adjustment, the door hinge 60 is secured. More specifically, the door hinge 60 is positioned against the pillar 73 by adjusting the space "L" therebetween or the position of the side door 1 against the main vehicle body "A", and it is fastened to the pillar 73 with the bolt 61.

After the skeleton 3 with the inner door panel 4 was mounted on the vehicle body "A", the outer door panel 5 is then mounted on the inner door panel 4 by inserting the projections 100a and 100b of the outer door panel 5 in to the respective positioning holes 101 and 102 of the inner door panel 4 and fastening the respective inner and outer door panels 4 and 5 with the bolts 30.

It is to be noted here that the adjustment of workings of the side door 1 against the main vehicle body "A", as done in the first embodiment above, is not required in this embodiment because the relative positions of the projectons 100a and 100b against the respective positioning holes 101 and 102 are determined and, as a consequence, the space between the outer door panel 5 and the vehicle body "A" is already adjusted. Accordingly, the adjustment of the workings of the side door 1 against the vehicle body "A" is made using the door hinge 60 without any obstruction from the outer door panel 5.

As shown in FIG. 24, it is further to be noted here that, in the door assembly line, the door skeleton 3 is mounted with the various interior door parts, the transverse H-shaped bracket "B" and the inner door panel 4 and then the door skeleton 3 is assembled with the main vehicle body "A" prior to the mounting of the outer door panel 5. Furthermore, it is to be noted that, in this embodiment, the workings of the side door 1 or the position of the side door 1 against the main vehicle body "A" can be adjusted during the assembly of the side door 1 with the vehicle body "A" prior to the mounting of the outer door panel 5 and with the temporary mounting of the outer door panel 5.

It is to be understood that the foregoing text and drawings relate to embodiments of the present invention given by way of examples but not limitation. Various other embodiments and variants are possible within the spirit and scope of the present invention.

What is claimed is:

1. A method for the assembly of a vehicle door with a skeleton interposed between an inner door panel and an outer door panel, comprising the steps of:
   mounting door lock mechanism parts on a first bracket;
   mounting said first bracket having said door lock mechanism parts thereon to a rear frame of the skeleton, said skeleton comprising said rear frame positioned at a rearward end portion of the vehicle door, a front frame positioned at a forward end portion thereof, an upper stay and a lower stay extending in a longitudinal direction and disposed in a spaced relationship, and a window glass guide interposed between and supported by said upper and lower stays, wherein said front frame extends vertically and has a square C-shaped form in cross section which opens rearwardly and said rear frame extends vertically and has a square C-shaped form in cross section which opens forwardly, said front frame forming a space for accommodating a window glass panel in association with said rear frame when assembled so as to allow their opening sides to face each other, and said rear frame being provided on the inner door panel side thereof with a cut-away portion adapted to allow said first bracket to be detachably mountable, said first bracket being large enough in size to cover said cut-away portion;

mounting other door mechanism parts; and then mounting said inner door panel on said skeleton.

2. A method as claimed in claim 1, further comprising the step of mounting window glass panel raising or lowering mechanism parts on a second bracket, and the step of detachably mounting said second bracket having said window glass panel raising or lowering mechanism parts thereon on said skeleton.

3. A method as claimed in claim 2, further comprising the steps of:

assembling said upper and lower stays with said window glass guide to form a third bracket in an I-shaped form;

mounting a window regulator on said upper stay of said third bracket;

mounting a fourth bracket on said window glass guide of said third bracket so that said fourth bracket is movable upwardly and downwardly; and providing said front frame and said rear frame with said third bracket, which has said window regulator disposed on said upper stay thereof and has said fourth bracket disposed on said window glass guide thereof, in such a manner that forward end portions of the upper and lower stays are mounted detachably on said front frame and rearward end portions of the upper and lower stays are mounted detachably on said rear frame.

4. A method as claimed in claim 1, further comprising the steps of:

temporarily mounting said outer door panel with a positioning means on said inner door panel or said skeleton;

adjusting a clearance of the vehicle door away from a vehicle body by positioning said vehicle door with respect to a door hinge attached to said skeleton;

detaching said outer door panel from said vehicle door; and then assembling door mechanism parts on said skeleton.

5. A method as claimed in claim 2, further comprising the steps of:

outfitting vehicle interior parts inside said vehicle body with no vehicle doors mounted;

assembling door interior parts on said skeleton and mounting said inner door panel on said skeleton; and adjusting a clearance between a vehicle body and said vehicle door while mounting said vehicle door on said vehicle body.

6. A method as claimed in claim 3, further comprising the steps of:

outfitting vehicle interior parts inside said vehicle body with no vehicle doors mounted;

assembling door interior parts on said skeleton and mounting said inner door panel on said skeleton; and adjusting a clearance between a vehicle body and said vehicle door while mounting said vehicle door on said vehicle body.

7. A method for the assembly of a vehicle door with a skeleton interposed between an inner door panel and an outer door panel, comprising the steps of:

mounting door lock mechanism parts on a first bracket;

mounting said first bracket having said door lock mechanism parts thereon to a rear frame of the skeleton, said skeleton comprising said rear frame positioned at a rearward end portion of the vehicle door, a front frame positioned at a forward end portion thereof, an upper stay and a lower stay extending in a longitudinal direction and disposed in a spaced relationship, and a window glass guide interposed between and supported by said upper and lower stays, wherein said front frame extends vertically and has a square C-shaped form in cross section which opens rearwardly and said rear frame extends vertically and has a square C-shaped form in cross section which opens forwardly, said front frame forming a space for accommodating a window glass panel in association with said rear frame when assembled so as to allow their opening sides to face each other, and said rear frame being provided on the inner door panel side thereof with a cut-away portion adapted to allow said first bracket to be detachably mountable, said first bracket being large enough in size to cover said cut-away portion;

mounting window glass panel raising or lowering mechanism parts on a second bracket;

mounting detachably said second bracket on said skeleton; and then mounting said inner door panel on said skeleton.

adjusting a clearance between a vehicle body and said vehicle door without said outer door panel while mounting said vehicle door on a door hinge fixed on said skeleton;

mounting said outer door panel with a positioning means on said skeleton or said inner door panel.

* * * * *